United States Patent [19]

Chang et al.

[11] Patent Number: 4,537,922

[45] Date of Patent: Aug. 27, 1985

[54] SULFUR STABILIZED OXIDIZED POLYOLEFIN COMPOSITION

[75] Inventors: Irving B. Chang; Robert E. Beckwith, Jr., both of Morristown, N.J.

[73] Assignee: Allied Corporation, Morris Township, Morris County, N.J.

[21] Appl. No.: 551,622

[22] Filed: Nov. 14, 1983

[51] Int. Cl.³ ............................................. C08F 27/04
[52] U.S. Cl. ..................................... 524/82; 428/523;
524/83; 524/418; 524/419; 525/333.9; 525/354
[58] Field of Search ............... 524/418, 419; 525/354, 525/333.9; 428/500

[56] References Cited

U.S. PATENT DOCUMENTS

| | | | |
|---|---|---|---|
| 2,952,649 | 9/1960 | McCall | 524/275 |
| 3,153,025 | 10/1964 | Bush et al. | 525/387 |
| 3,282,888 | 11/1966 | Pines et al. | 524/418 |
| 3,322,711 | 5/1967 | Bush | 524/586 |
| 3,352,816 | 11/1967 | Meyer et al. | 524/419 |
| 3,434,993 | 3/1969 | Mirabile | 524/586 |
| 3,687,890 | 8/1972 | Suski et al. | 524/418 |
| 4,439,615 | 3/1984 | Rosenberger et al. | 524/419 |

*Primary Examiner*—George F. Lesmes
*Assistant Examiner*—E. Rollins Buffalow
*Attorney, Agent, or Firm*—Richard A. Negin; Patrick L. Henry

[57] ABSTRACT

The present invention is a sulfur stabilized composition. The composition comprises an oxidized polyolefin, preferably oxidized polyethylene or oxidized polypropylene, with oxidized polyethylene being most preferred. The composition of the present invention optionally contains a filler.

11 Claims, No Drawings

SULFUR STABILIZED OXIDIZED POLYOLEFIN COMPOSITION

DESCRIPTION

This invention is in the field of polyolefin compositions; more particularly, the invention relates to sulfur stabilized oxidized polyolefin compositions.

SUMMARY OF THE INVENTION

The present invention is a sulfur stabilized composition. The composition comprises an oxidized polyolefin, preferably oxidized polyethylene or oxidized polypropylene, with oxidized polyethylene being most preferred. The preferred oxidized polyethylene has a Brookfield viscosity at a 149° C. of from about 100 to about 40,000 centipoises. There is from about 0.1 to about 25, preferably 0.1 to 10 and more preferably 0.2 to 5%, and most preferably 0.2 to 3% by weight based on the weight of the oxidized polyolefin of sulfur.

The composition can contain from 0 to 150 and preferably 1 to 125% by weight based on the weight of the oxidized polyolefin of a filler. Preferred fillers include calcium carbonate, talc, and silica.

The present invention also includes an article comprising a substrate and a coating on the substrate wherein the coating comprises an oxidized polyolefin and from 0.1 to 10, preferably 0.1 to 5 and more preferably, 0.2 to 3% by weight based on the weight of the oxidized polyolefin of sulfur.

DESCRIPTION OF THE PREFERRED EMBODIMENTS

The present invention includes sulfur stabilized oxidized polyolefin compositions. The present invention also includes articles comprising substrates coated with these compositions.

One embodiment of the present invention is a composition comprising an oxidized polyolefin from 0.1 to 25, preferably 0.1 to 10, more preferably 0.1 to 5, and most preferably 0.2 to 3% by weight based on the weight of the oxidized polyolefin of sulfur. The amount of sulfur is based on the amount of elemental sulfur where a sulfur containing compound or composition is used. The oxidized polyolefin is preferably selected from oxidized polyethylene and oxidized polypropylene with oxidized polyethylene being most preferred. Oxidized polyethylene useful in the present invention has a Brookfield viscosity at a 149° C. and from 100 to 40,000 centipoises.

The composition can contain from 0 to 150, preferably 1 to 125, and most preferably from 50 to 125% by weight based on the weight of the oxidized polyolefin of a filler.

The oxidized polyethylene useful in the composition of the present invention can be prepared by the method disclosed in U.S. Pat. Nos. 3,434,993; 3,322,711; and 3,153,025. Oxidized polyethylene which can be used in the formulations of the present invention has a softening point of 100° to 150° C. as measured by ASTM (E-28); a penetration hardness of about 10.0 dmm to about 0.1 dmm, preferably 9.0 dmm to 0.5 dmm or less as measured by ASTM (D-5); a density of 0.90 to 1.00 grams per cubic centimeter as measured on the ASTM (D-1505); a Brookfield viscosity at 149° C. of 100 to about 40,000 cps; an acid number of about 10 to 50, preferably 15 to 45, milligrams of KOH necessary to neutralize one gram of sample; and a number average molecular weight of 1,000 to about 10,000, preferably 1,500 to 6,000. Typical oxidized polyethylene polymers which can satisfactorily be used are summarized in Table 1:

TABLE 1

| Sample | Softening Point °C. (ASTM E-28) | Softening Point °F. | Hardness ddm (ASTM D-5) | Viscosity-cps 149° C. (300° F.) (Brookfield) | Acid No. mg KOH/g |
|---|---|---|---|---|---|
| A | 104 | 219 | 5.5 | 157.5 | — |
| B | 107 | 225 | 2.5 | 132.5 | 16 |
| C | 100 | 212 | 9.0 | 122.5 | 15 |
| D | 110 | 230 | 1.5 | 190.0 | — |
| E | 111 | 232 | 1.2 | 190.0 | — |
| F | — | — | <0.5 | 2,500 | 41 |
| G | 138 | 280 | <0.5 | 9,000 | 20 |
| H | 140 | 284 | <0.5 | 30,000 | 11 |
| I | — | — | <10 | >30,000 | 7 |
| J | — | — | <10.5 | 25,000 | 20 |

A preferred oxidized polyethylene is Sample F having a hardness of less than 0.5 dmm; a density of 1.00 grams per cubic centimeter; a Brookfield viscosity at 150° C. of about 2500 centipoises (cps) and an acid number of 41 with a molecular weight between 3,000 and 5,000.

For the purposes of the present invention the term sulfur includes elemental sulfur in any of its forms. The term sulfur can also include compositions and compounds containing sulfur which release the sulfur without other portions of the sulfur composition or compound interfering detrimentally with the composition. A compound is a material where the sulfur is chemically combined and a composition is where the sulfur is in a mixture or blend. Examples of such a compound are: dipentamethylene thioramhexasulfide; 4-morpholinyl,2-benzothiazole disulfide; and 4,4'dithiodimorpholine. It has been found that the addition of sulfur to oxidized polyethylene does not result in an increase in the viscosity but reduces the viscosity slightly.

The viscosity of oxidized polyolefins, particularly oxidized polyethylene increase with temperature, shear, and time. The addition of the sulfur results in slightly decreasing the viscosity of the oxidized polyethylene. The maintenance of a low viscosity is important to enable the composition to be used in various processes. For example, by having a low viscosity the composition of the present invention can be more easily coated onto a substrates.

The composition of the present invention can contain from 0 to 150, preferably 1 to 25, and more preferably 50 to 125% by weight based on the oxidized polyolefin of a filler.

Any suitable filler can be used. The fillers may optionally be treated with various coupling agents or adhesion promotors as is known to those skilled in the art. Such fillers may be selected from a wide variety of minerals, metals, metal oxides, siliceous materials, metal salts, and mixtures thereof. Examples of fillers include alumina, aluminum hydrates, feldspar, asbestos, talc, calcium carbonates, clay, carbon black, quartz, novaculite and other forms of silica, kaolinite, bentonite, garnet, mica, saponite, bentonite, etc. The foregoing recited fillers are illustrative only and are not meant to limit the scope of the fillers that can be utilized in this invention. There is up to 150 percent by weight of the asphalt of filler, and preferably 30 percent to 90 percent by weight of the oxidized polyolefin of filler.

The composition can contain from 0 to 40 and preferably 5 to 20% by weight based on the weight of viscosity modifier. Such viscosity modifiers include paraffin wax, and paraffin oils.

The present invention includes articles having a substrate and a coating on the substrate. The coating can comprise a stabilized oxidized polyolefin composition as described above.

The compositions of the present invention can be formed by melt blending sulfur into molten oxidized polyolefin. The molten mixture is stirred until the blend is uniform.

Several examples are set forth below to illustrate the nature of the invention and the manner of carrying it out. However, the invention should not be considered as being limited to the details thereof.

EXAMPLE 1

Compositions of the present invention were made using oxidized polyethylene (OPE) having a softening point as measured on ASTM D-3109-77 of 137° C. (279° F.), a hardness measured according to ASTM D-5 of 0.5 dmm, a density of 1.00 grams per cubic centimeter as measured in ASTM D-1505, a Brookfield viscosity at 150° C. of 1900 centipoises, and an acid number of 41 milligrams of KOH/gram.

The oxidized polyethylene was melt blended with powdered sulfur at 149° C. (300° F.) with continual stirring. The stirring was conducted with a motorized high speed stirrer in steel pint cans. The blend was stirred for ½ hour at 149° C., placed in an oven at 149° C. for 16 hours without stirring, removed from the oven and allowed to stand at room temperature 25° C. for 8 hours and then placed in an oven at 149° C. for 16 hours. Composition in weight percent and Brookfield viscosity in centipoises is summarized in Table 2 below:

TABLE 2

|  | Ex. 1 | Comp. 1 |
| --- | --- | --- |
| OPE | 98 | 100 |
| Sulfur | 2 | — |
| Viscosity (cps) @ |  |  |
| 0 hrs, 149° C. | 1900 | 1900 |
| ½ hr, 149° C. | 2025 | 2300 |
| 16 hrs, 149° C. | 6200 | 6900 |
| 8 hrs, 25° C. | — | — |
| 16 hrs, 149° C. | 7000 | 7800 |
| Comment | uniform | skin |

The oxidized polyethylene upon being subjected to heat and stirring resulting in an increase in viscosity. In Comparative 1 containing 100% oxidized polyethylene, a second phase skin developed. The skin that developed was not compatible with the rest of the composition. In Example 1, 2% sulfur resulted in an uniform although darker mixture with no skin forming. The Example 1 composition had a lower viscosity upon being heated and sheared.

While exemplary embodiments of the invention have been described, the true scope of the invention is to be determined from the following claims.

What is claimed is:

1. A composition comprising an oxidized polyolefin having a number average molecular weight of from 1500 to 6000 and from 0.1 to 25 percent by weight based on the weight of the oxidized polyolefin of a sulfur compound selected from the group consisting of elemental sulfur and sulfur compounds which release elemental sulfur.

2. The composition as recited in claim 1 wherein there is from 0.1 to 10 percent by weight based on the weight of the oxidized polyolefin of sulfur.

3. The composition as recited in claim 2 wherein there is from 0.2 to 5 percent by weight based on the weight of the oxidized polyolefin of sulfur.

4. The composition as recited in claim 3 wherein there is from 0.2 to 3 percent by weight based on the weight of the oxidized polyolefin of sulfur.

5. The composition as recited in claim 1 wherein the oxidized polyolefin is selected from oxidized polyethylene and oxidized polypropylene.

6. The composition as recited in claim 5 wherein the oxidized polyolefin is oxidized polyethylene.

7. The composition as recited in claim 6 wherein the sulfur is elemental sulfur.

8. The composition as recited in claim 1 wherein the sulfur is selected from elemental sulfur, sulfur containing compositions, and sulfur containing compounds.

9. The composition as recited in claim 1 wherein there is from 1 to 125 percent by weight based on the weight of the oxidized polyolefin of filler.

10. The composition as recited in claim 7 wherein the filler is selected from the class consisting of calcium carbonate, talc, and silica.

11. The composition of claim 1 wherein the sulfur compound is selected from the group consisting of elemental sulfur, 4-morpholinyl, 2-benzothiazole disulfide; dipentamethylene thioramhexasulfide; and 4,4' dithiodimorpholine.

* * * * *